United States Patent
Yeung et al.

(10) Patent No.: US 8,804,264 B1
(45) Date of Patent: Aug. 12, 2014

(54) METHOD TO APPLY USER DATA FOR READ CHANNEL TRAINING AND ADAPTATION IN HARD DISK DRIVE APPLICATIONS

(75) Inventors: Kwok W. Yeung, Milpitas, CA (US); Xin-Ning Song, San Jose, CA (US)

(73) Assignee: SK hynix memory solutions inc., San Jose, CA (US)

( * ) Notice: Subject to any disclaimer, the term of this patent is extended or adjusted under 35 U.S.C. 154(b) by 0 days.

(21) Appl. No.: 13/485,418

(22) Filed: May 31, 2012

Related U.S. Application Data

(60) Provisional application No. 61/492,271, filed on Jun. 1, 2011.

(51) Int. Cl.
*G11B 5/09* (2006.01)
*G11B 27/36* (2006.01)

(52) U.S. Cl.
USPC .................. 360/53; 360/31; 360/46

(58) Field of Classification Search
None
See application file for complete search history.

(56) References Cited

U.S. PATENT DOCUMENTS

| | | | |
|---|---|---|---|
| 2007/0116108 A1* | 5/2007 | Chen et al. | 375/231 |
| 2008/0276156 A1 | 11/2008 | Gunnam et al. | |
| 2008/0301521 A1 | 12/2008 | Gunnam et al. | |
| 2013/0201576 A1* | 8/2013 | Grundvig | 360/31 |

* cited by examiner

*Primary Examiner* — Regina N Holder
(74) *Attorney, Agent, or Firm* — Van Pelt, Yi & James LLP

(57) ABSTRACT

Calibrating a read channel is disclosed. Previously written user data is read from an auxiliary memory. The previously written user data is processed through a plurality of write channel stages. The output of at least one of the plurality of write channel stages is compared to the output of a corresponding read channel stage to generate an error signal.

20 Claims, 5 Drawing Sheets

METHOD TO APPLY USER DATA FOR READ CHANNEL TRAINING AND ADAPTATION IN HARD DISK DRIVE APPLICATIONS

CROSS REFERENCE TO OTHER APPLICATIONS

This application claims priority to U.S. Provisional Patent Application No. 61/492,271 entitled METHOD TO APPLY USER DATA FOR READ CHANNEL TRAINING AND ADAPTATION IN HARD DISK DRIVE APPLICATIONS filed Jun. 1, 2011 which is incorporated herein by reference for all purposes.

BACKGROUND OF THE INVENTION

Typical hard disk drive read channel adaptation and training techniques can use data patterns that can lead to inaccurate and sub-optimal calibration results. Therefore, improvements in hard disk drive read channel adaptation and training techniques and the data patterns used would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Applying user data for read channel training and adaptation in hard disk drive applications is disclosed. Using the techniques described therein, user data can be used to calibrate a read channel. As the user data is representative of the actual data that a user writes to the hard disk drive, more accurate and precise calibration of the read channel can be achieved.

Figure 1:
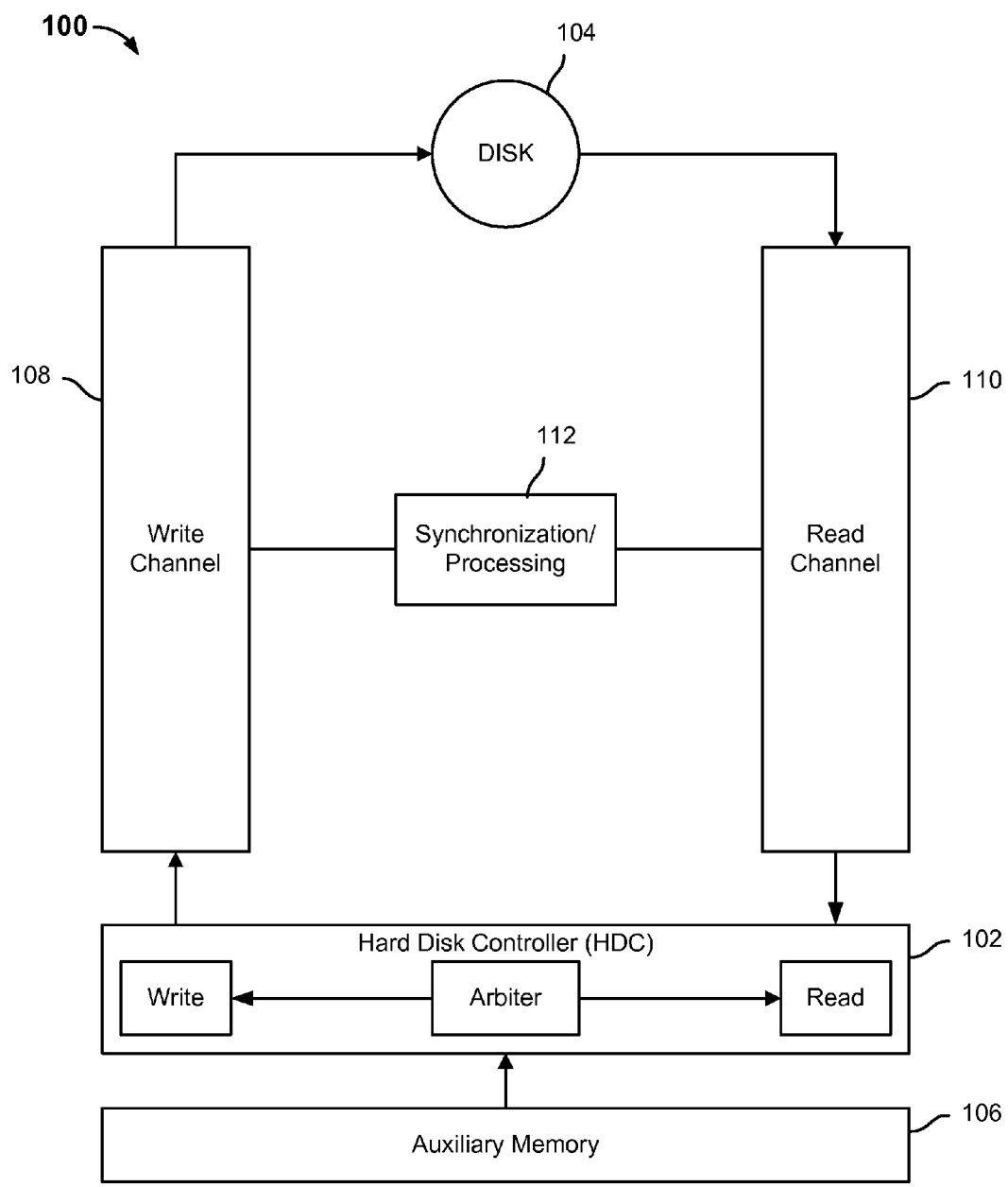
FIG. 1 is a block diagram illustrating an example of a system for applying user data for read channel training and adaption in hard disk drive applications.

FIG. 1 is a block diagram illustrating an example of a system for applying user data for read channel training and adaption in hard disk drive applications. In the example shown, Hard Disk Controller (HDC) 102 is configured to control (e.g., via an arbiter) writing and reading data to and from hard disk drive 104.

When writing data to hard disk drive 104, the disk write logic of HDC 102 can retrieve the data from auxiliary memory 106, where data can be stored prior to being written to a hard disk drive. One example of an auxiliary memory is an external memory such as DDR DRAM. The data can then be sent or otherwise outputted to hard disk drive 104 over write channel 108, which can include one or more stages of encoding logic for encoding the data prior to being written to hard disk drive 104.

When reading data from hard disk drive 104, HDC 102 can read or otherwise receive as input the data from hard disk drive 104 over read channel 110, which can include one or more stages of decoding logic, which may correspond to the encoding logic in write channel 108.

In some embodiments, a portion of the encoding/decoding logic stages can be included as part of the hard disk controller or can be integrated in any other appropriate configuration.

Typically, the disk write logic of the HDC and the write channel encoding logic are inactive during a disk read. However, in the example shown, HDC 102 is configured such that it can activate its disk write logic and the write channel encoding logic during disk read to allow for user encoded data to be supplied for read channel training and adaptation. For example, by activating HDC disk write logic and the write channel encoding logic during disk read, previously written user data can be retrieved from the auxiliary memory (where it is maintained and stored) and outputted to the write channel to be processed by the encoding logic while the same data written on the hard disk drive is read back and processed through read channel decoding logic. Because the output of an intermediate decoding stage corresponds with the output of a particular intermediate encoding stage (which is encoding the known data retrieved from the auxiliary memory), a comparison of the outputs can be used to determine errors and calibrate the read channel (e.g., by tuning parameters associated with decoding logic stages in the read channel) to improve its performance (e.g., reduce bit-error rate (BER)). Because the data read from the disk originated from the same user data that is retrieved from the auxiliary memory, the encoded data is precise and can be used as a point of comparison to determine errors in the decoding logic. Additionally, by processing previously written user data through a write channel that includes one or more stages of encoding logic, various encoded forms of the previously written user data can be generated to allow for one or more read stages to be concurrently calibrated.

Synchronization/Processing 112 can be used to synchronize or format the outputs of the corresponding write and read channel stages so that they can be matched (e.g., aligned in time and properly formatted) for comparison analysis.

In some embodiments, although the data that is maintained in the auxiliary memory is retrieved and sent along the write channel so that encoded forms of the previously written data can be used to perform calibration, the data is not written to the disk. Instead, the write channel logic can be repurposed to simulate a virtual write for calibration purposes. In some embodiments, instead of write channel logic being repurposed or reused, dedicated hardware, software, and/or firmware can be implemented to form an independent channel used to simulate the encoding logic of a write channel, which can be used to encode retrieved data and generate reference data to perform read channel training and adaptation.

Figure 2:
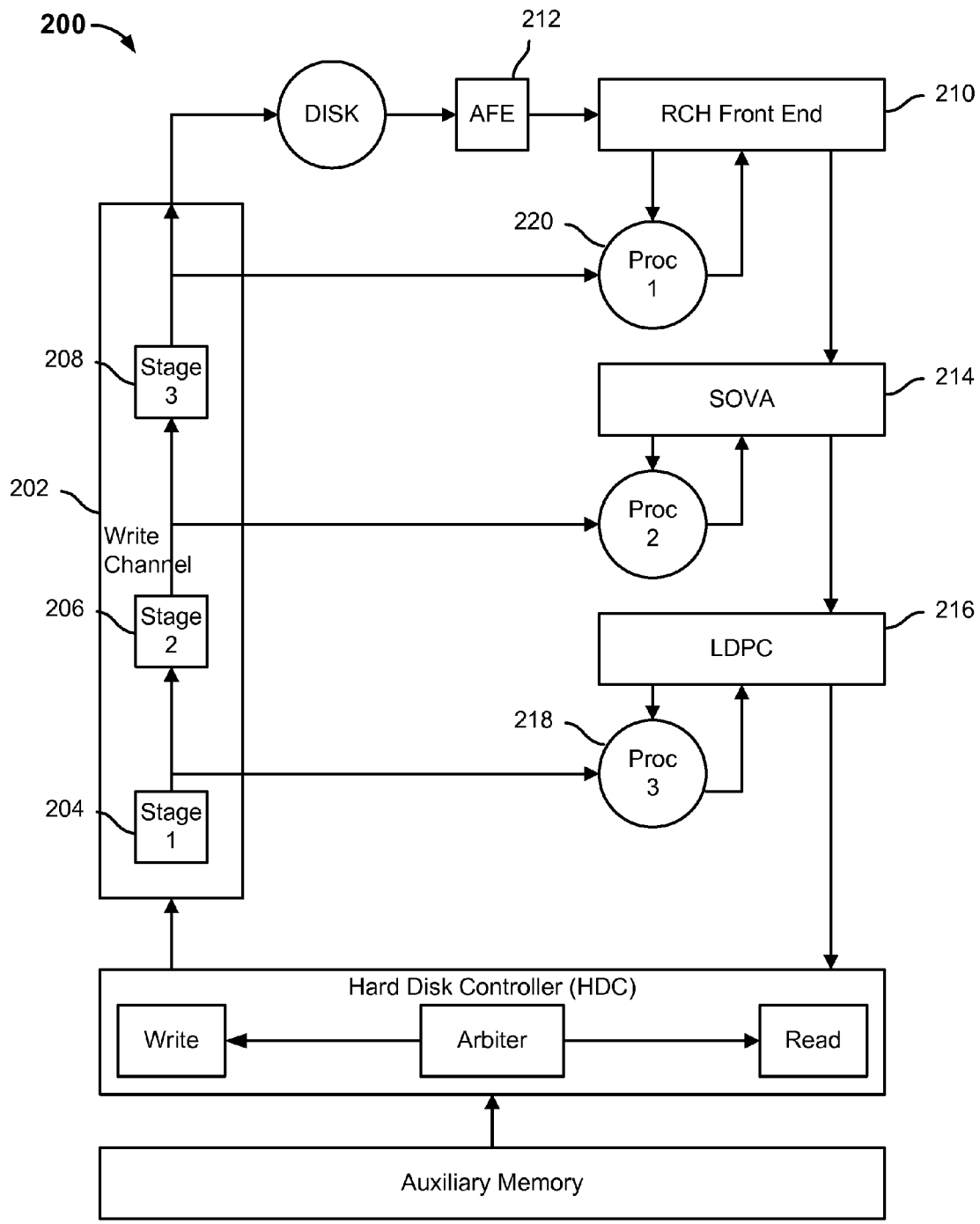
FIG. 2 is an example of a system for applying user data for read channel training and adaptation in hard disk drive applications.

FIG. 2 is an example of a system for applying user data for read channel training and adaptation in hard disk drive applications. In some embodiments, system 200 of the example shown may be used to implement system 100 of FIG. 1. In the example shown, the read channel includes several stages of decoding logic, such as Read Channel Front End (210) (which may include Analog Front End circuitry (212)), Soft output Viterbi algorithm (SOVA) decoder (214), and low-density parity-check code (LDPC) decoder (216). The decoding stages can be associated with corresponding encoding stages (204-208) included in write channel 202 (e.g., corresponding LDPC encoder, SOVA stage, Front End stage). In some embodiments, write channel 202 includes LDPC encoders and time multiplexers (which may add preambles or other forms of padding to a data stream). In some embodiments, the LDPC encoder includes several stages such as a scrambler, interleaver, data path protection, or parity adder. Other encoding and decoding stage configurations are possible.

In order to perform training and calibration of the read channel, the output of the different encoding stages can be pulled out and formatted before being applied as reference data to train and adapt logic in the corresponding decoding stages. For example, the output of stage 1 (204), which could be an LDPC encoder, can be pulled out and formatted by Processor 3 (218) before being applied as reference data to train and adapt the logic of corresponding LDPC decoder (216). The formatted output of Stage 1 can be compared with the output of LDPC decoder 216 using Processor 3 (218) to generate an error signal or statistical measures (e.g., error distributions, means, medians, standard deviations, etc.) used to calibrate the LDPC decoder logic. In some embodiments, the processor can also be used to synchronize the outputs of the corresponding encoding and decoding stages so that appropriate corresponding outputs are matched in time and can be compared. For example, the output of a write channel stage can be delayed to align it in time with the output of the corresponding read channel stage. As another example, Processor 1 (220) can delay calibration until the retrieved user data has passed through stages 1-3 of the encoding logic of the write channel so that an appropriate output can be pulled out and used as reference data to compare with the output of RCH Front End (210).

Figure 3:
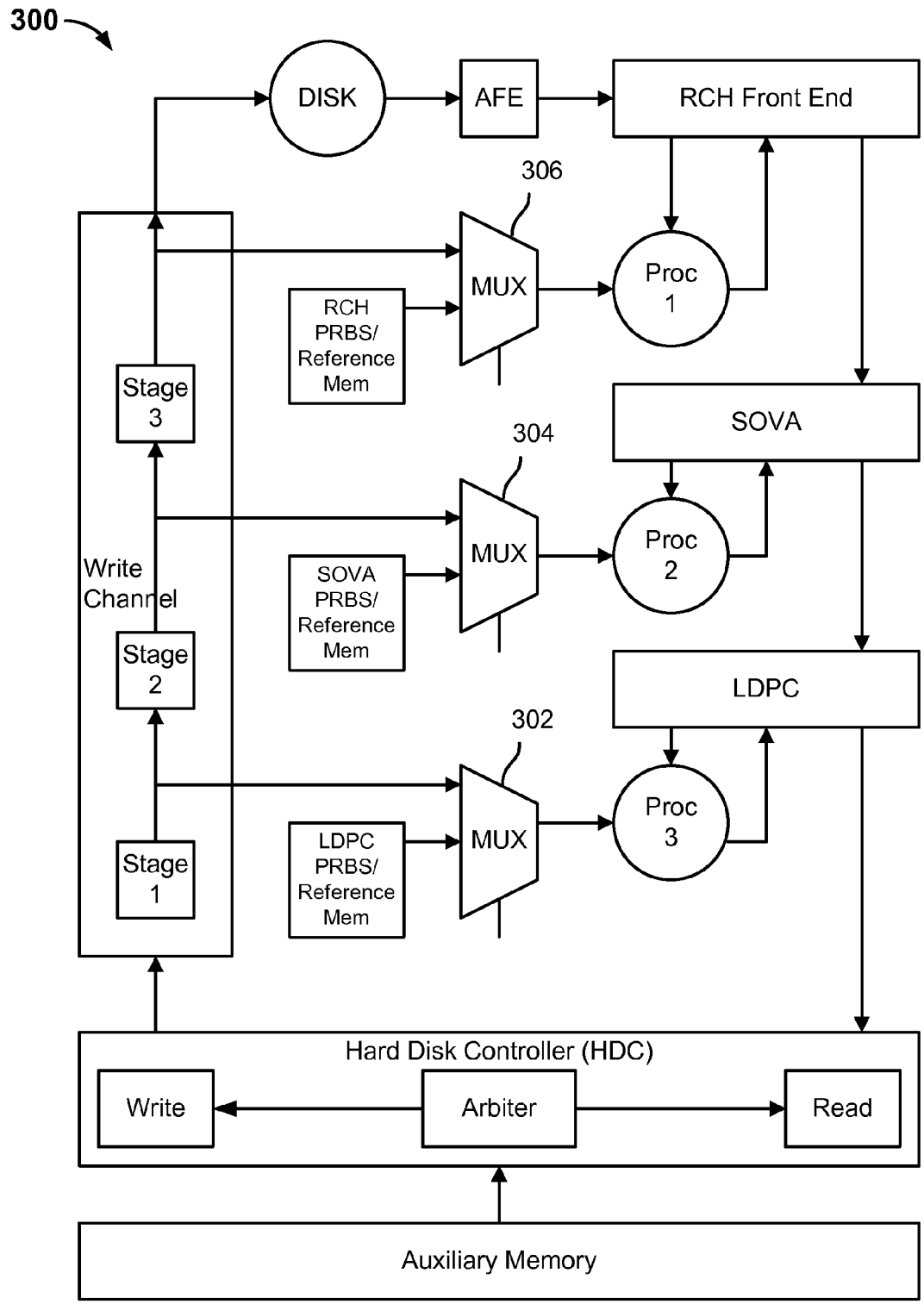
FIG. 3 is an example of a system for applying user data for read channel training and adaptation in hard disk drive applications.

FIG. 3 is an example of a system for applying user data for read channel training and adaptation in hard disk drive applications. In some embodiments, system 300 of the example shown may be used to implement system 100 of FIG. 1. In the example shown, in addition to, or instead of, reference data being generated by passing retrieved user data through the different stages of encoding logic of a write channel, other sources of reference data, such as pseudo-random binary sequences (PRBS) and reference memory (e.g., pre-programmed reference patterns such as LDPC encoded data stored inside memory) can also be used to supply reference data used to perform read channel training and adaptation. In the example shown, multiplexers 302-306 are used so that different sources of reference data can be selected from to perform read channel training and adaptation. For example, at the time of manufacture, PRBS sources can be used as quick and efficient reference data for training and adaptation of read channel stages. As another example, using user data that is processed by encoding logic stages can allow for read channel training and adaptation to be performed at any time (e.g., in the field by a service technician or as part of a recovery process in the event that decoding of read data fails).

Figure 4:
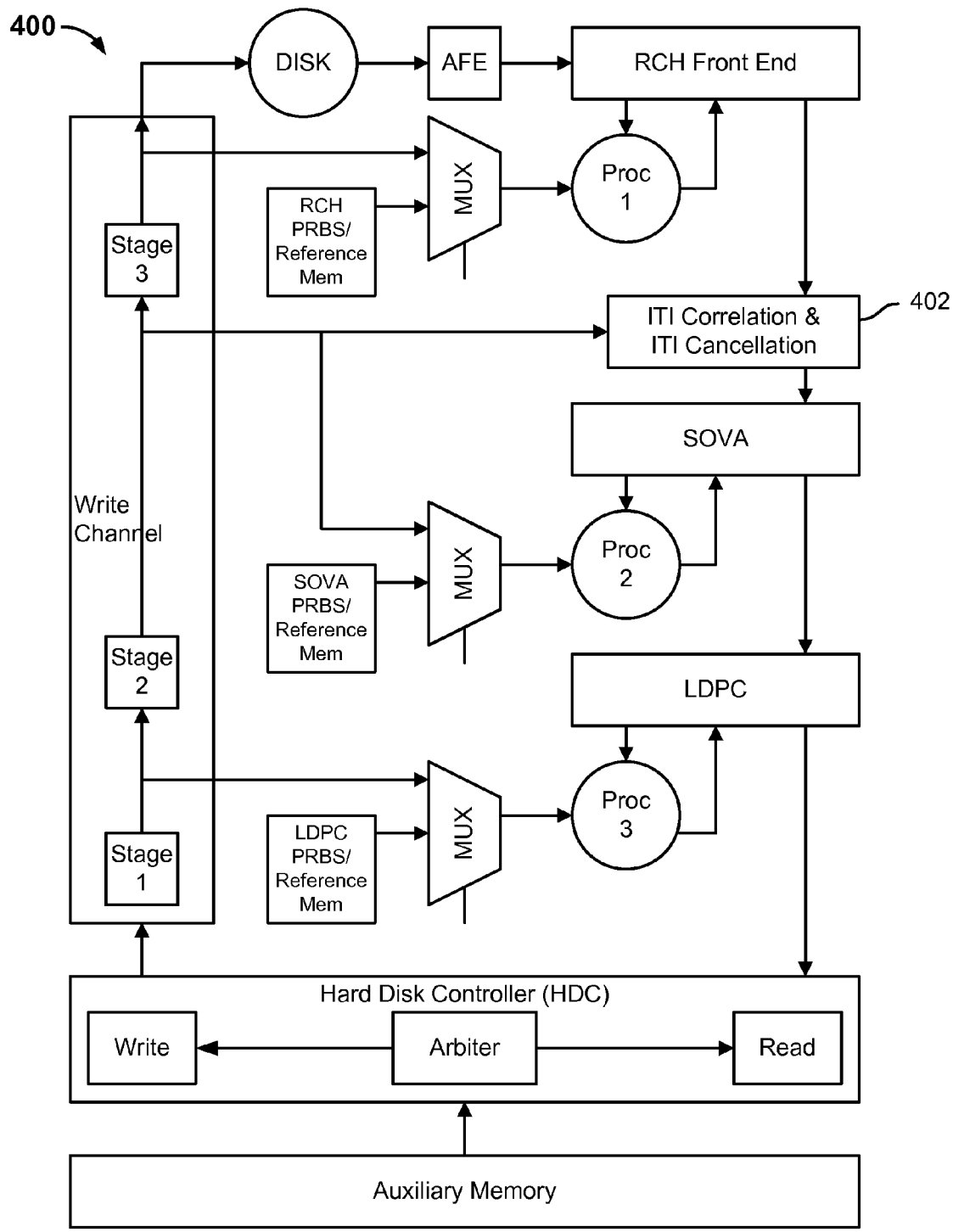
FIG. 4 is an example of a system for applying user data for read channel training and adaptation in hard disk drive applications.

FIG. 4 is an example of a system for applying user data for read channel training and adaptation in hard disk drive applications. In some embodiments, system 400 of the example shown may be used to implement system 100 of FIG. 1. In some embodiments, the calibration techniques described above can be implemented by utilizing or repurposing functionality of an existing system, so that the amount of overhead or additional hardware and control to be added to implement read channel calibration can be minimized. For example, a system for Shingled Magnetic Recording (SMR) can be repurposed when in a calibration mode to perform read channel calibration. For example, to support SMR, side-track data (e.g., data from a track that is adjacent to or neighboring a center-track of a hard disk drive being read) can be provided and matched up synchronously with center-track data to perform Inter-Track Interference (ITI) cancellation during a disk read operation. When performing ITI cancellation, the hard disk drive controller can activate write functionality while reading and send side-track data over the write channel as it reads center-track data from the hard disk drive. After the side-track data has been encoded to a certain stage, it can be pulled out from the write channel and used to perform ITI correlation and cancellation, as shown in 402.

When performing read channel calibration, however, instead of sending side-track data to facilitate reading of center-track data, the HDC can be configured to repurpose or otherwise reuse the write channel to send previously written user data over the write channel while reading the same user data from the hard disk drive to perform read channel training and adaptation.

Figure 5:
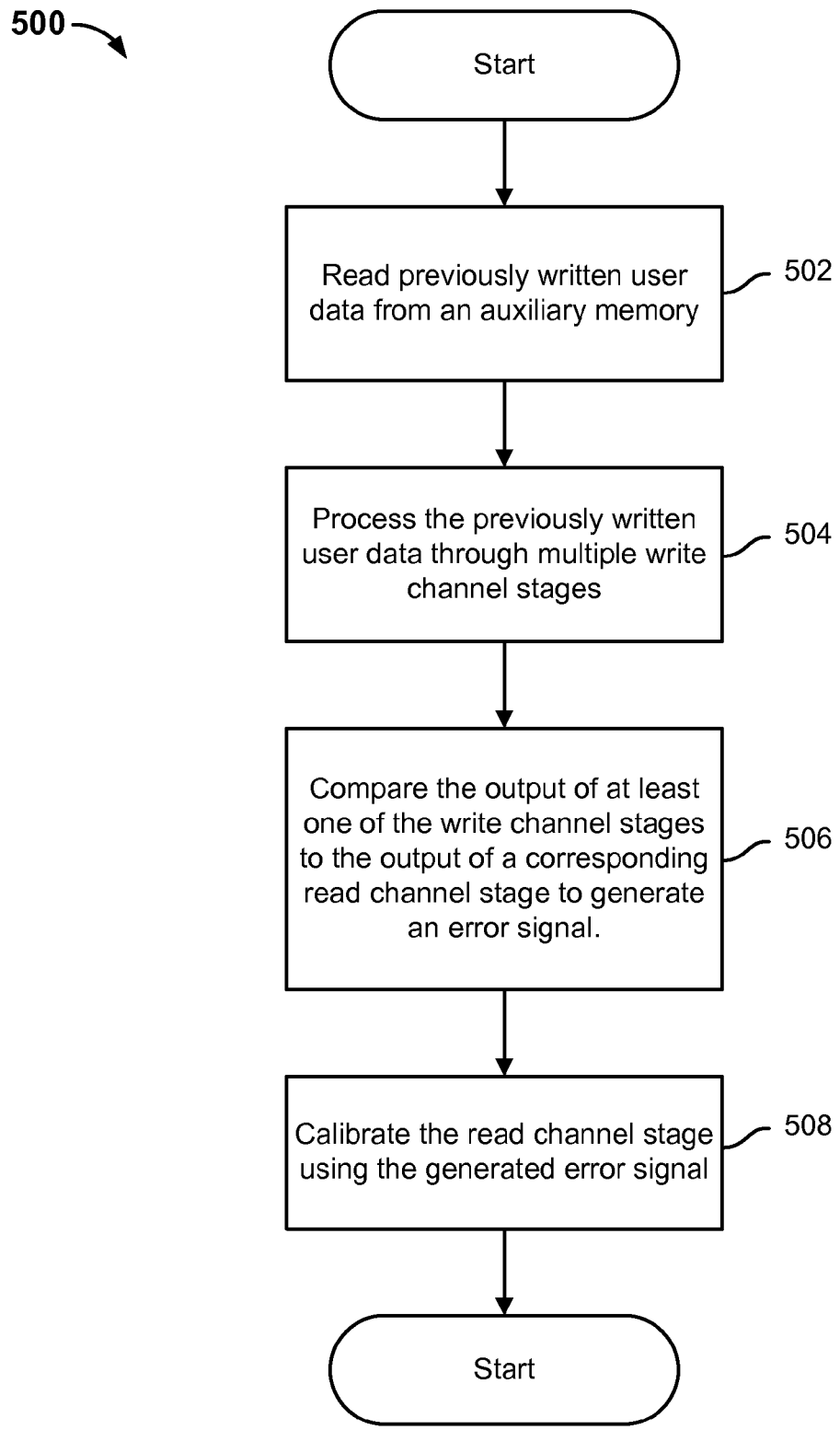
FIG. 5 is a flow diagram illustrating an embodiment of a process for applying user data for read channel training and adaptation in hard disk drive applications.

FIG. 5 is a flow diagram illustrating an embodiment of a process for applying user data for read channel training and adaptation in hard disk drive applications. In some embodiments, process 500 is executed by hard disk controller 102 of FIG. 1. The process begins at 502 when previously written user data is read from an auxiliary memory. In some embodiments, user data includes data that is written to a hard disk drive during the course of user interaction with a device including the hard disk drive. Other types of data may be used to supplement read channel calibration as well. For example, in some embodiments, training data (e.g., PRBS data) may be used. In some embodiments, the data used in calibration is not constrained and can be any arbitrary data.

In some embodiments, the auxiliary memory that the previously written user data is retrieved from can be a memory external to the hard disk drive such as physical memory (e.g., DDR DRAM) or any other appropriate type of auxiliary memory.

At 504, the previously written user data is processed through one or more write channel stages. Examples of write channel stages include the stages included in an LDPC encoder (e.g., scrambler, interleaver, data path protection, parity adder), front end circuitry (e.g., before being written to disk), or any other appropriate write channel stage.

At 506 the output of at least one of the write channel stages is compared to the output of a corresponding read channel stage to generate an error signal. In some embodiments, prior to the comparison, the outputs of the write channel stage and the corresponding read channel stage are synchronized such that they can be compared. For example, the output of a stage may be delayed so that both outputs are aligned in time for comparison analysis. In some embodiments, the comparison can be delayed so that the comparison is not made until the outputs from the write channel stage and corresponding read channel stage are available. As another example, in some embodiments, the HDC may delay or manipulate the timing of sending write and read control commands such that outputs of corresponding write and read channel stages are synchronized. In some embodiments, prior to the comparison, the outputs of the write channel stage and corresponding read channel stage are formatted so that they can be compared (e.g., because the various encoding/decoding stages may produce outputs that are in different formats).

In some embodiments, the generated error signal includes a signal indicating a data mismatch or any other appropriate error signal. In some embodiments, the generated error signal includes error statistics and statistical measures such as error distributions, means, medians, and standard deviations, or any other appropriate error statistics and statistical measures.

At 508, the corresponding read channel stage is calibrated using the generated error signal. For example, tunable parameters (e.g., coefficients for FIR filters) associated with the read channel stage can be calibrated using the generated error signal. For example, an error signal generated for the LDPC stage (e.g., resulting from the comparison of the output of the LDPC decoding and corresponding encoding stages) can be used to perform LDPC adaptation and statistics gathering. As another example, an error signal generated for the SOVA stage can be used to perform SOVA adaptation. As another example, an error signal generated for a read channel front end stage can be used to perform equalization adaptation, target adaptation, timing loop adaptation, gain loop adaptation, Magneto-Resistance Asymmetry (MRA)/offset loop adaptation, and determination of a minimum state (e.g., minimum value of all state metric elements).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for calibrating a read channel, including:
   an auxiliary memory that stores previously written user data;
   a plurality of write channel stages that process the previously written user data from the auxiliary memory; and
   an error processor that generates an error signal at least in part by comparing an output of at least one of the plurality of write channel stages to an output of a corresponding read channel stage, wherein the corresponding read channel stage is calibrated based at least in part on the generated error signal.

2. The system as in claim 1, wherein the previously written user data is not constrained.

3. The system as in claim 1, wherein the previously written user data is multiplexed with a data source including one or more pseudo-random binary sequences.

4. The system as in claim 1, wherein the write channel stages are reused.

5. The system as in claim 1, wherein the output of the at least one write channel stage is delayed to align it in time with the output of the corresponding read channel stage.

6. The system as in claim 1, further including a hard disk controller configured to output the previously written user data to the write channel stages while inputting corresponding data from the read channel.

7. The system as in claim 1, further including a hard disk controller that has a facility to output neighbor track write signal information to aid in reading a signal from a shingled magnetic recording system, and wherein the neighbor track output facility is used to output the same track as the read channel in a calibration mode.

8. The system as in claim 1, wherein the corresponding read channel stage is trained in the field using an arbitrary sequence.

9. A method of calibrating a read channel, including:
   reading previously written user data from an auxiliary memory;
   processing the previously written user data through a plurality of write channel stages; and
   generating an error signal at least in part by comparing an output of at least one of the plurality of write channel stages to an output of a corresponding read channel stage, wherein the corresponding read channel stage is calibrated based at least in part on the generated error signal.

10. The method as in claim 9, wherein the previously written user data is not constrained.

11. The method as in claim 9, wherein the previously written user data is multiplexed with a data source including one or more pseudo-random binary sequences.

12. The method as in claim 9, wherein the output of the at least one write channel stage is delayed to align it in time with the output of the corresponding read channel stage.

13. The method as in claim 9, further including outputting the previously written user data to the write channel stages while inputting corresponding data from the read channel.

14. The method as in claim 9, wherein the corresponding read channel stage is trained in the field using an arbitrary sequence.

15. A computer program product for calibrating a read channel, the computer program product being embodied in a non-transitory tangible computer readable storage medium and comprising computer instructions for:
   reading previously written user data from an auxiliary memory;
   processing the previously written user data through a plurality of write channel stages; and
   generating an error signal at least in part by comparing an output of at least one of the plurality of write channel stages to an output of a corresponding read channel stage, wherein the corresponding read channel stage is calibrated based at least in part on the generated error signal.

16. The computer program product as recited in claim 15, wherein the previously written user data is not constrained.

17. The computer program product as recited in claim 15, wherein the previously written user data is multiplexed with a data source including one or more pseudo-random binary sequences.

18. The computer program product as recited in claim 15, wherein the output of the at least one write channel stage is delayed to align it in time with the output of the corresponding read channel stage.

19. The computer program product as recited in claim 15, further including outputting the previously written user data to the write channel stages while inputting corresponding data from the read channel.

20. The computer program product as recited in claim 15, wherein the corresponding read channel stage is trained in the field using an arbitrary sequence.

\* \* \* \* \*